Jan. 28, 1930.                M. E. STRIEBY ET AL                1,744,840
VOLTAGE INDICATING AND TRANSLATING DEVICE
Original Filed Nov. 25, 1924

INVENTORS
M. E. Strieby and C. H. Fetter
BY
ATTORNEY

Patented Jan. 28, 1930

1,744,840

UNITED STATES PATENT OFFICE

MAURICE E. STRIEBY AND CHARLES H. FETTER, OF MILLBURN, NEW JERSEY, ASSIGNORS TO AMERICAN TELEPHONE AND TELEGRAPH COMPANY, A CORPORATION OF NEW YORK

VOLTAGE-INDICATING AND TRANSLATING DEVICE

Original application filed November 25, 1924, Serial No. 752,230. Divided and this application filed December 30, 1925. Serial No. 78,481.

This invention relates to voltage-indicating devices and particularly to means for producing a visual indication whenever the voltage exceeds a predetermined limit.

This is a division of the applicant's copending application Serial No. 752,230 filed Nov. 25, 1924, particularly with reference to Figs. 3 to 7 inclusive thereof.

In the operation of electrical circuits, particularly telephone circuits, it is desirable to obtain an indication whenever the voltage across the circuit exceeds a predetermined limit. Where this voltage is small, it is generally difficult or expensive to provide a suitable visual indicator. As is well known, a neon tube possesses the characteristic of glowing whenever a discharge occurs between its electrodes resulting from a predetermined voltage. The amount of energy required to produce the glow is practically negligible so that it is possible to use such a device in connection with low energy indicating systems. The neon tube also is characterized by the absence of time lag in its operation.

Our invention consists broadly in a method and means for indicating voltages above a predetermined limit or limits upon signaling, power or electrical circuits which means employs the characteristics of the neon tube referred to above.

Figure 1:
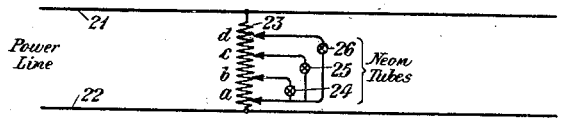
Figure 2:
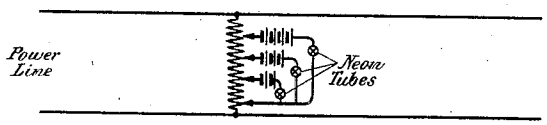
Figure 3:
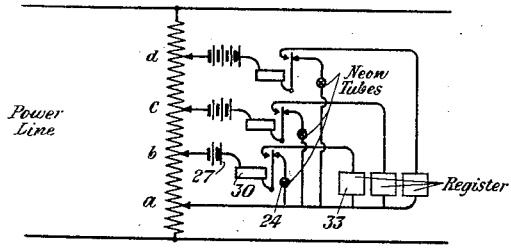
Figure 3A:
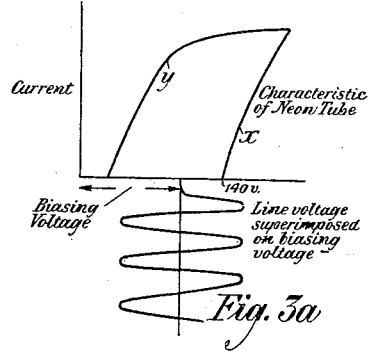
Figure 4:
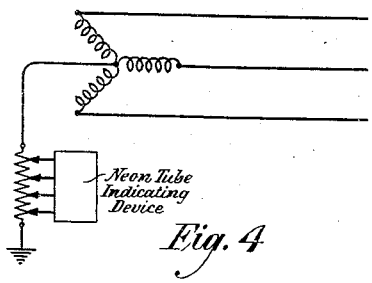
Figure 5:
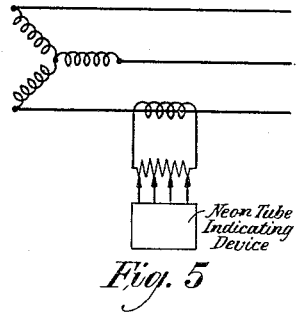

Other objects of our invention will be apparent from the following description when read in connection with the attached drawing of which Figures 1, 2 and 3 show schematically arrangements for indicating transient voltages upon power lines; Fig. 3$^a$ illustrates graphically the principle underlying certain of the figures; Figs. 4 and 5 show various methods of connecting the indicating devices with power circuits.

The arrangement shown in Fig. 1 serves to indicate whenever the voltage across a power line exceeds a predetermined limit. Present means for determining the magnitude of transient voltages upon power circuits are very unsatisfactory. In the arrangement shown, a potentiometer 23 is bridged across conductors 21 and 22 which may be a single phase power line or a phase of a multiphase line. Connected between points $a$ and $b$ of the potentiometer is a neon tube 24 and similarly connected between the points $a$ and $c$ and $a$ and $d$ are similar tubes designated 25 and 26 respectively. The points $a$, $b$, $c$ and $d$ are so joined that when a definite potential, as, for example, 100,000 volts exists across conductors 21 and 22 the voltage across that portion of the potentiometer between the points $a$ and $b$ will be a definite fraction of this voltage, say 1/1000 thereof, or 100 volts. The drop between $a$ and $c$ may, for example, be equivalent to 200 volts and that between $a$ and $d$ to 300 volts. If the voltage between 21 and 22 was of the order of 100,000 or more, and if the tubes operate upon 100 volts or more, then all of the lamps would be flashed because the difference of potential between $a$ and $b$, $a$ and $c$ and $a$ and $d$ would be 100 volts or more. Now, let us assume that the voltage is of the order of 50,000. Since the part of the potentiometer between $a$ and $b$ is only 1/1000 of the entire resistance, the voltage between these points would be 50, which would be insufficient to flash the tube 24. On the other hand, tubes 25 and 26 would flash and thereby the observer would know that the voltage was between 50,000 and 100,000 volts. If the voltage dropped below 50,000, tube 26 alone would flash. It will be seen, therefore, that an arrangement such as shown in Fig. 1 gives an instantaneous and visible indication of voltages upon power circuits.

The arrangement shown in Fig. 2 employs biasing batteries of different potential which cut down the magnitude of the line potential necessary to operate the lamps. The principle of this arrangement is set forth in the description of Fig. 1$^a$ in the copending application Serial No. 752,230, referred to hereinbefore and needs no further description.

A further application of the invention is shown in Figs. 3 and 3$^a$. Fig. 3$^a$, which is the characteristic of a neon tube, indicates that a tube will flash at 140 volts. After a tube flashes the current rises quickly to a maximum which is represented by the curve $x$. If the voltage is released the current does not diminish along the curve $x$ but drops off more gradually as shown by the curve $y$. During this time the tube continues to glow. It is, of course, undesirable for an indicating device such as a neon tube to continue to indicate the existence of a certain voltage after the voltage has fallen below the break-down voltage of the tube. The arrangement shown in Fig. 3 is intended to care for such a condition. In this arrangement each local indicating circuit comprises in addition to the neon tube and the biasing battery a relay which is so connected that a circuit is completed through the winding and the contact of the relay. Thus, for example, the circuit controlled by the drop in potential between $a$ and $b$ includes the tube 24, the battery 27, the relay 30. Whenever the lamp is operated and current flows therethrough, relay 30 will be energized. This opens the back contact of the armature the relay opening the circuit through the tube. By the closing of its front contact the circuit is established from the battery 27 through a register 23 which records the number of times that the tube operates. With such an arrangement we obtain not only a visual indication of an over-voltage but also a record of such by means of registering devices. Fig. 3$^a$ also shows graphically the advantage of biasing the tube circuits to reduce the necessary line voltage to produce operation of the tube. If, for example, the tube were designed to operate upon 140 volts and the maximum voltage upon the line circuit would not exceed 40 volts, the tube could be biased 100 volts. The incoming wave would therefore have to be only of the order of 40 volts in order to effect operation of the tube.

In Figs. 1 to 3 inclusive the indicating device has been shown bridged across a single phase circuit or one of the phases of a multi-phase circuit. It will, of course, be apparent that the indicating device may be connected in other ways. Thus, for example, in Fig. 4 it is shown connected between the neutral point of a three-phase system and ground. And in Fig. 5 it is shown connected with one of the phases of a three-phase circuit by means of a current transformer.

The arrangements shown in the aforedescribed figures provide simple and effective means for producing results not heretofore attainable except through the employment of elaborate apparatus. It will therefore be apparent that by utilizing the principle underlying the operation of the neon tube a decided advance has been made in the art.

While this invention has been disclosed as embodied in a particular form and arrangement of parts, it is to be understood that it is capable of embodiment in other and different forms without departing from the spirit and scope of the appended claims.

What is claimed is:

1. In a voltage indicating system the combination with a line circuit adapted to have set up therein a voltage in excess of a known limit, a potentiometer bridged across the said circuit, a plurality of neon tubes connected in parallel each with the other and each being in shunt with a definite portion of the said potentiometer, and means to open the circuit of each tube after it is operated.

2. In a voltage indicating system the combination with a line circuit having a voltage set up therein in excess of a known limit, a potentiometer bridged across the said circuit, a neon tube connected in shunt with a definite portion of the said potentiometer, means to potentially bias the said tube, and means to open the circuit of the said tube after it has operated.

3. In a voltage indicating system, the combination with a line circuit having a voltage set up therein in excess of a known limit, a potentiometer bridged across the said circuit, a neon tube connected in shunt with a definite portion of the said potentiometer, means to open the circuit of the said tube after it has been operated by the voltage impressed thereon by the portion of the potentiometer across which the said tube is bridged, and a recording device responsive to the means for opening the neon tube circuit to record the operation of the said tube as the result of the said voltage.

4. In a voltage indicating system, the combination with a line circuit having a voltage set up therein the magnitude of which may exceed a predetermined limit, a potentiometer bridged across the said circuit, an indicating circuit bridged across a definite portion of the said potentiometer, the said indicating circuit including a neon tube, a source of biasing voltage and the winding and back contact of a relay, and a registering device connected with the front contact of said relay to record each operation of the said tube and relay.

5. In a voltage indicating system, the combination with a line circuit adapted to have set up therein a voltage in excess of a predetermined limit, of a potentiometer bridged across the said circuit, a plurality of neon tubes connected in parallel, each with the other, and each being effectively shunted across a definite portion of the said potentiometer, a plurality of relays each individual to one of said neon tubes, having its winding normally connected in series with a tube through the back contact of the said relay, and a plurality of registering devices each individual to a relay and connected with the front contact thereof to record the operation of the said relay and its associated neon tube as the result of the voltage impressed thereon.

In testimony whereof, we have signed our names to this specification this 29th day of December, 1925.

MAURICE E. STRIEBY.
CHARLES H. FETTER.